United States Patent
Singhal

(10) Patent No.: US 8,484,268 B2
(45) Date of Patent: *Jul. 9, 2013

(54) RANDOM WAVE ENVELOPE DERIVED RANDOM NUMBERS AND THEIR USE IN GENERATING TRANSIENT KEYS IN COMMUNICATION SECURITY APPLICATIONS PART II

(76) Inventor: Tara Chand Singhal, Torrance, CA (US)

(*) Notice: Subject to any disclaimer, the term of this patent is extended or adjusted under 35 U.S.C. 154(b) by 403 days.

This patent is subject to a terminal disclaimer.

(21) Appl. No.: 12/386,197

(22) Filed: Apr. 15, 2009

(65) Prior Publication Data

US 2009/0202073 A1 Aug. 13, 2009

Related U.S. Application Data

(62) Division of application No. 11/485,208, filed on Jul. 12, 2006, now Pat. No. 7,688,976.

(51) Int. Cl.
*H04L 9/26* (2006.01)

(52) U.S. Cl.
CPC ........................................ *H04L 9/26* (2013.01)
USPC .............................. 708/250; 380/46; 380/262

(58) Field of Classification Search
CPC ...................................................... H04L 9/26
USPC ..................................... 380/46, 262; 708/250
See application file for complete search history.

(56) References Cited

U.S. PATENT DOCUMENTS

| | | | | |
|---|---|---|---|---|
| 4,806,881 A | * | 2/1989 | Ives et al. | 332/108 |
| 4,810,975 A | * | 3/1989 | Dias | 331/78 |
| 5,381,481 A | * | 1/1995 | Gammie et al. | 380/212 |
| 5,812,955 A | * | 9/1998 | Dent et al. | 455/561 |
| 5,951,459 A | * | 9/1999 | Blackwell | 600/13 |
| 6,571,263 B1 | * | 5/2003 | Nagai | 708/3 |
| 6,940,599 B1 | * | 9/2005 | Hovde | 356/432 |
| 2002/0094085 A1 | * | 7/2002 | Roberts | 380/262 |
| 2004/0114761 A1 | * | 6/2004 | Atsumi et al. | 380/268 |

OTHER PUBLICATIONS

Ramakrishnan, K.; Balasubramanian, A.; Mishra, S.; Sridhar, R., "Wireless security protocol using a low cost pseudo random number generator," Military Communications Conference, 2005. MILCOM 2005. IEEE, vol., No., pp. 1333-1339 vol. 3, Oct. 17-20, 2005.*

* cited by examiner

*Primary Examiner* — Matthew Henning
(74) *Attorney, Agent, or Firm* — Steve Roeder, Esq.

(57) ABSTRACT

A random wave envelope is created from a set of bounded random numbers by additively combining a triangle, a square and a sine wave. The random wave envelope is then used to create a sequence of wave random numbers from the wave envelope, which are used to generate random-variant keys for encryption in place of the pre-placed encryption key. An ambiguity envelope is thus created over the transmission of data packets as random-variant-keys are used that are distinct and separate for each packet and may also be distinct and separate for each incoming and outgoing packet. The random-variant keys are only created at the time of the actual use for encrypting or decrypting a data packet and not before and then discarded after one time use. The random-variant keys may be used in wireless network using wireless access points, cellular phone and data networks and ad hoc mobile wireless networks.

18 Claims, 9 Drawing Sheets

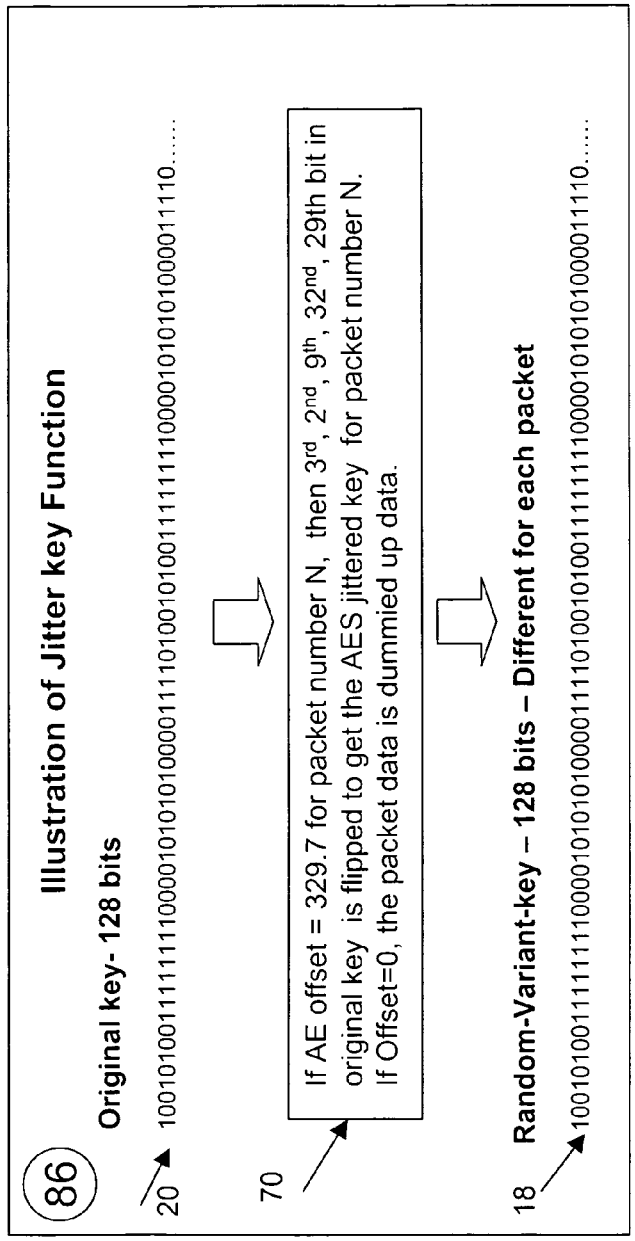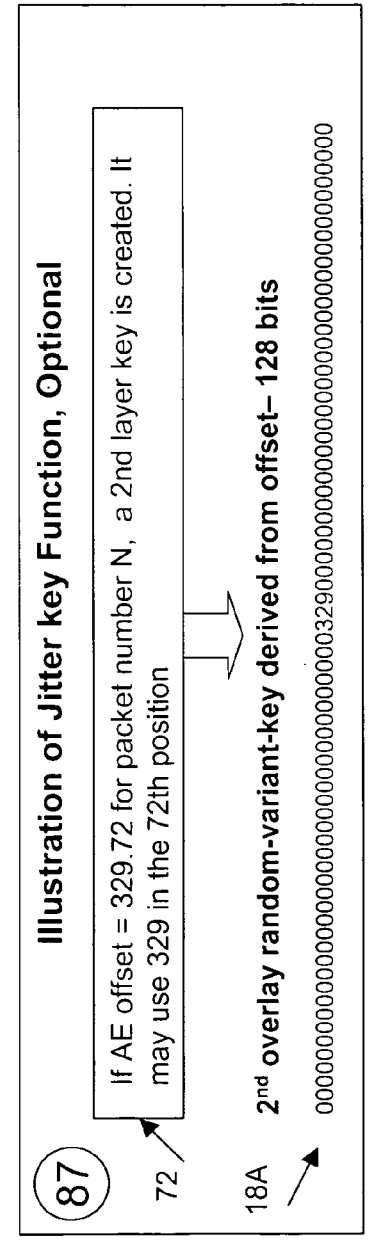
Figure 3B-1
Figure 3B-2

RANDOM WAVE ENVELOPE DERIVED RANDOM NUMBERS AND THEIR USE IN GENERATING TRANSIENT KEYS IN COMMUNICATION SECURITY APPLICATIONS PART II

CROSS REFERENCE TO RELATED APPLICATIONS

This application is a divisional of application Ser. No. 11/458,208, filed Jul. 12, 2006, titled "Systems and Methods of Ambiguity Envelope Encryption Scheme and Applications, of Tara Chand Singhal.

Provisional Application Ser. No. 60/666,941, titled "Method and apparatus for wireless security using Jitter-key based ambiguity envelope and a wireless access point authentication system" filed on Mar. 31, 2005, by Tara Chand Singhal, is noted here

FIELD OF THE INVENTION

The present invention is directed to systems and methods for an encryption scheme and its applications that make the security of encryption keys irrelevant to the security of wireless and wired transmissions by using random-variant-keys that are different from the prior art encryption keys.

BACKGROUND

In prior art encryption schemes a standard well-known encryption algorithm is used. The algorithm may be initialized with a seed value. This algorithm is present at both ends of a transmission path such as a wireless network.

There is an encryption key, which is randomly generated and is defined by the number of bits such as, 56 bits, 64 bits, 128 bits, 192 bits, 256 bits, 384 bits or 512 bits. The longer the key in bits, more difficult it is to break it by brute force. The key needs to be also present at both ends of the transmission path. Hence once a key is created it is exchanged between both the ends of the transmission path that is used for the wireless transmission.

At one end of the transmission path, a plain text is entered into the encryption algorithm that uses the encryption key to encrypt the file that is made up of data packets and at the other end the same key is then used to decrypt the message to get back the plain text.

In this scheme of encryption since the algorithm is standard, great care is exercised in protecting the key, in how the key is stored and safe guarded while in storage, how it is distributed or exchanged, how it is safeguarded during the distribution or exchange process, and how it is changed or re-keyed on a periodic basis such as every month on highly secure systems in military and perhaps once a year in other systems. When a wireless transmission path is used, it is easier for hackers to break the key.

Hence the security of transmissions depends upon the key and key strength in bits. However, with the increase in computer power and use of wireless as well, it has become easier to break such keys. For a while, 128 bits was considered a strong key. However, it is not now and 256 bit keys have begun to be used.

Use of wireless technology has grown in many applications. These wireless technologies use digital transmission of data packets. A digital data packet has a header and a data body. The data in the body is encrypted during transmission.

One of the popular uses of wireless transmission has been and is between a laptop computer and a wireless access point (WAP) or router to a company network or the Internet. Other uses have been between the sales terminal of a business and their central server.

Such WAPs are commonly used by businesses and in off-site locations such as airports, hotels and coffee shops as well as in homes. These uses typically operate for a few hundred meters, based on the strength of the transmission. To facilitate wide spread use and manufacture of such devices, various industry standards have been developed, such as 802.11b and 802.11g.

Another use of wireless that is emerging is the use of Bluetooth® (Bluetooth), where cell phones equipped with Bluetooth capability communicate to a wireless earpiece. Still another use is in military application such as in ad hoc mobile wireless networks in a theatre of operation. Cellular phones are another prominent use of wireless networks.

It has become well known, that others may capture and decipher private wireless transmissions to steal private information. It has become known that in spite of encryption, the hackers have been successful in stealing private transmissions. A standard called wired equivalent privacy (WEP) has been developed for these wireless transmissions. The WEP is designed to deliver the same encryption as available on a wired transmission; hence the name wired equivalent privacy.

The weaknesses that have been demonstrated are: (i) to be able to capture transmissions from very great distances using special telescopic antennas. For example, in tests conducted, wireless transmissions between laptop and WAPs, that from a user point of view are limited a few hundred feet, can be captured from as far away as 11 miles using a special antenna. Wireless transmissions using Bluetooth that from a user perspective are good for 10 to 20 feet can be captured from as far away as a city block. (ii) One of the ways of stealing private transmission have been via specially equipped roving van, which rove around city blocks to find and capture transmissions. (iii) Defeating the authentication between the user and the wireless access point and setting up rogue wireless access points between the user and the real wireless access points that redirect traffic to a spoofed access point. And (iv) breaking the encryption key, that is used for encryption. Having access to samples of plain text and encrypted text, an encryption key such as a 128-bit key is easily broken. Hence, even though the wireless transmissions are encrypted, they are still compromised by hackers.

The ease with which the security of wireless transmission has been compromised has been demonstrated both by the information security personnel of banks as well as the special agents of FBI in Information System Security Association local chapter security briefings.

Hence, it is a primary objective of this invention to have a different form of encryption scheme that does not rely on the security of wireless keys to provide security for wireless transmissions.

It is also an objective of this invention to have encryption scheme that does not rely ori the security of encryption keys for providing networks that use both wireless and wired networks.

SUMMARY

This invention describes Ambiguity Envelope (AE), a different form of encryption technology specifically developed for security of wireless transmissions but may be used for wired transmission and a combination of wired and wireless networks locally or nationally.

In AE an ambiguity envelope is created over the transmission path of data packets, so that no specific encryption key, as in prior art, is used. Instead, random-variant-keys are used that are distinct and separate for each packet and may also be distinct and separate for each incoming and outgoing packet.

AE uses prior art encryption algorithms and prior art encryption keys and provides systems and methods for random-variant-keys that are derived from and used in place of the prior art encryption keys.

These random-variant-keys have no mathematical relationship to each other or to the prior art encryption keys. The random-variant-keys are not created, stored at either end, or exchanged with each end of transmission. The random-variant-keys are only created at the time of the actual use for encrypting or decrypting a data packet and then discarded after one time use.

Because the random-variant-keys are neither stored, nor transmitted by any method, there are no keys to create, secure, safeguard, distribute, destroy and recover as in prior art. Because random-variant-keys are indeterminate based on multiple degrees of randomness, as described later, the random-variant-keys cannot be computed. Therefore, random-variant-keys used in transmission cannot be determined. Thus AE provides wireless transmission security that does not have the deficiencies of the prior art as described in the background section.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts. The drawings are:

FIG. 3A-B are block diagrams that illustrate the operation of the encryption scheme of the current invention.

DESCRIPTION

Figure 1:
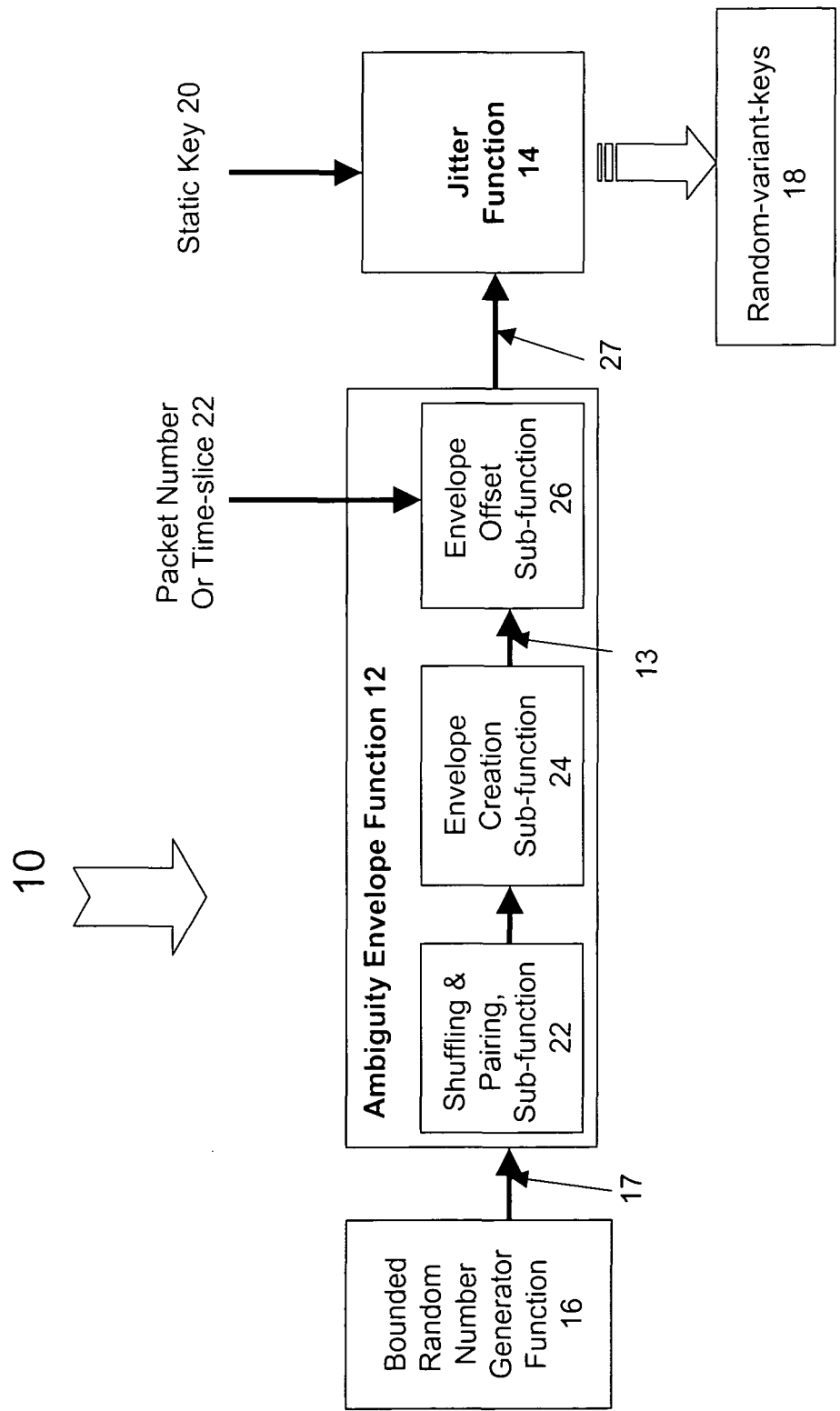
FIG. 1 is a block diagram that illustrates the encryption scheme of the current invention.

With reference to FIG. 1, this invention has an Ambiguity Envelope (AE) security system 10, which has a bounded random number generator function 16, an ambiguity envelope function 12 and a jitter function 14. The output of the bounded random number generator function 16 is called bounded random numbers or BRNs 17. BRNs 17 are input to the ambiguity envelope function 12. The AE function 12 using a shuffling and pairing sub-function 22, and an envelope creating sub-function 24 creates an ambiguity envelope 13. An envelope offset sub-function 26 uses envelope 13 and when inputted packet number 22, outputs an envelope offset 27, which is input to the jitter function 14. The jitter function 14 using the input of the ambiguity envelope offset 27 and the prior art key 20 outputs random-variant-keys 18.

The AE implementation uses a small memory and processing throughput footprint that rides over the existing prior art encryption schemes thus making the AE implementation relatively convenient in prior art encryption devices and prior art devices that embody embedded encryption mechanisms. Integrated circuits, firmware and components that facilitate use of AE may be manufactured and sold to manufacturers of wireless devices such as cell phones, wireless access points, and other devices.

Figure 2:
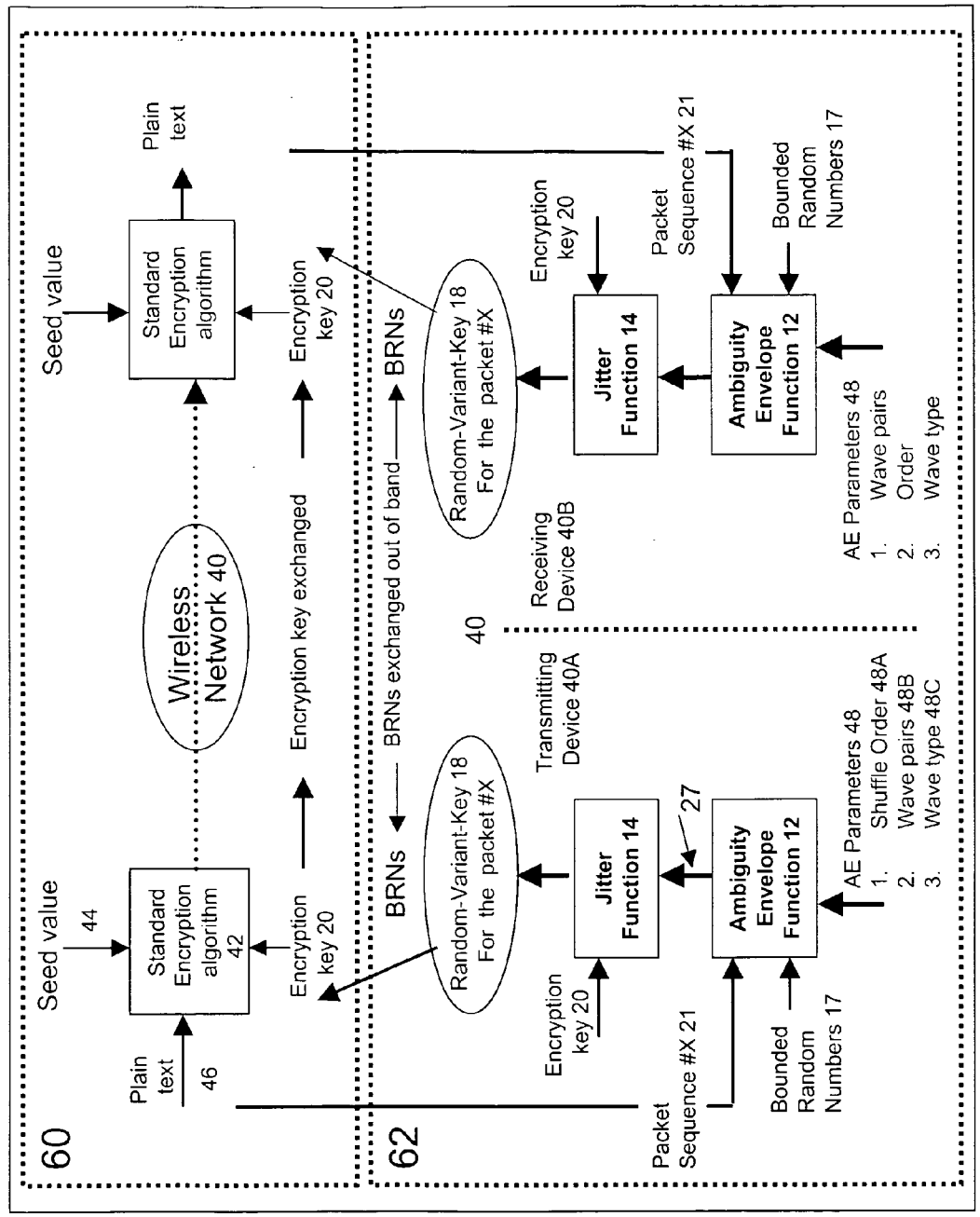
FIG. 2 is a detailed block diagram that illustrates the encryption scheme of the current invention.

With respect to upper part 60 of FIG. 2, the system 10 uses prior art encryption scheme using encryption algorithm 42, seed value 44, plain text 46 and encryption key 20 over a prior art wireless network 40.

As illustrated in lower part 62 of FIG. 2, in AE 10, the prior art encryption key 20 is jittered or randomly modified to create random-variant-keys 18 for each packet #X. The random-variant-key 18 is then what is used for each packet instead of the prior art key 20. The random-variant-key 18 is like the prior art key 20 in every respect including the key length. The difference between the random-variant-keys 18 and the encryption key 20 is that the random-variant-keys 18 are randomly created variants of the encryption key 20.

As shown, the random-variant key 18 is created by a Jitter function 14 to which is input, the prior art encryption key 20, and the ambiguity envelope offset 27. The offset 27 is output by the AE function 12, when the AE function 12 is input the packet sequence #X 21. The envelope 13, which is used to compute the offset 27 is based on the BRNs 17 and the AE parameters 48 as described later.

In the AE function 12, the packet sequence #X 21 is used to read an offset value 27 from the envelope 13 and is used by the jitter function 14 to create a random-variant-key for that packet number #X 21.

The ambiguity envelope 13 has x-axis as packet sequence number and y-axis has as the amplitude or offset of the envelope. This offset value is read from the envelope for a given packet number and is used by the Jitter function 14 to create a random-variant-keys 18 for this packet. Hence, the random-variant-keys are different for every packet and is created at the time of use for one time use in the temporary memory and then discarded.

A time slice such as one second or some other time, in place of packet number 22 may also be used. The packet number is preferred as it is a recognized unique prior art mechanism to identify the order and sequence of transmission of packets between the two ends of transmission. However a time slice instead of packet may also be used provided the time system clocks at the ends of transmission are synchronized and can be relied upon.

With reference to FIG. 2, the AE function 12 and Jitter function 14 are present at both ends of the transmission path. For illustration purposes, the line 40 divides the transmitting end 40A and the receiving end 40B.

The BRNs 17 and the AE parameters 48 enable the random variation of the prior art key 20 resulting in random-variant-keys 18. The BRNs 17 are created at one end of the transmission path and then transferred to the other end by an out-of-band method depending upon the application as described later with reference to FIGS. 4, 5, 6 and 7.

With reference to FIGS. 1 and 2, AE parameters 48 determine how the BRNs 17 are transformed into an ambiguity envelope 13 using shuffling and pairing function 22 and a envelope creation function 24. The offset function 26 outputs an offset 27 of the envelope 13 when input a packet sequence 21. These functions 22, 24 and 26 are described in more detail later and add or provide multiple degrees of random separation from the BRNs to the envelope itself. Thus knowledge of the BRNs 17 themselves does not provide knowledge or computation of the ambiguity envelope 13. The AE parameters 48 may be unique and different for different classes of wireless devices that use encryption such as Wireless access point's network and cell phones.

With reference to FIGS. 1 and 2, in a system of encryption for communication security that uses an encryption algorithm 42 and a pre-placed encryption key 20, this invention provides a security function 10 that generates a sequence of random-variant-keys 18 one at a time, on a per packet basis in temporary memory of an encryption device from the pre-placed key 20 at the time of encryption and not before and uses these random-variants-keys 18 for encryption instead of the pre-placed key 20 and immediately thereafter discards the random-variant-keys 18.

Bounded Random Number Generator Function 16

Prior art random generators of any type may be used to generate a sequence or set of random numbers of specified number of digits. When the random number is limited to a specified number of digits it may be called a bounded random number or a BRN. For example, if an up to 2 digit random number is derived from a larger random number generated from a prior art random number generator function it is a bounded random number.

The random numbers may be bounded to any number of digits depending upon the application. For some applications they may be single digit bounded and for some other applications they may be bounded to such as 2 or many more digits. Further, a sequence of such bounded random numbers is created. Such a sequence may have a short sequence of 6, or a medium sequence, or a long sequence that have many tens of bounded random numbers. A sequence that is even and of at least six numbers is preferred as is described later. These bounded random numbers are used for creating an indeterminate envelope as described later. The envelope is considered indeterminate having multiple stages or degrees of random separation from the BRNs themselves.

Ambiguity Envelope Function 12

This function has three sub-functions as described here. The input to the function 12 is the sequence of BRNs from the function 16 and the output is an ambiguity envelope offset 27, which is input to the jitter function 14. The three sub-functions are:

Shuffling and Pairing Sub-Function 22

This sub-function takes the BRNs 17 shuffles them, and then pairs them so that each pair may describe cycle time and amplitude parameters of a wave. As a simplified illustration, if there are six numbers, 12, 45, 56, 23, 67, 98 generated in that order by the BRN function 16, then the shuffling function shuffles this sequence in one of many shuffles. An AE parameter 48A may be used to define one of many shuffle approaches. The shuffled BRNs are then paired in three pairs. Another AE parameter 48B may be used to define the pairing. The pairs then may be further shuffled to define which of the number of a pair represent the cycle time of the wave and which represents the amplitude. The output of this sub-function is a number of pairs. As a simplified illustration, when the BRNs are six in number, output of this function, are three pairs of numbers, where each pair represents the cycle time and amplitude of a wave. The three wave pairs from the six BRNs after the operation of this function may be (56, 98), (45,12), and (23,67) where the first number of the pair is cycle time and the second number is the amplitude.

Envelope Creation Function 24

In this function, each pair of BRNs is then mapped to a wave type such as a sine wave, or a square wave or a triangle wave. Again an AE parameter 48C may define which one of many possible approaches to mapping may be used. The wave types are chosen to be a sinusoidal, a triangle and a square wave type. Other wave types may also be used but these wave types are preferred as they are defined by a pair of numbers that map to two of the BRNs and are distinct in their properties of how their amplitude on y-axis varies along the x-axis.

Once the mapping to the wave types is done, this function then takes the three waves and additively combines them into one envelope. By adding these wave types of different types results is an ambiguity envelope 13. Optionally a phase value may be assigned to each of the waves before they are additively combined if one of the BRNs may be used to represent a phase value. In addition, a phase may be added to the entire envelope, where such a phase would be different for the sending and receiving ends of the transmission.

How the BRNs 17 may be converted to an ambiguity envelope 13 has been described. Many approaches in addition to the above may be used and are not ruled out. The shuffling, pairing and then shuffling within the pair that map to one of the wave types provide different types of random approaches to separate the envelope from the BRN itself. Mere knowledge of the BRNs themselves would make impossible the creation of the envelope. Alternatively the BRNs may be straight forward used to create an envelope without the use of shuffling, pairing and shuffling with in pairs as defined by the AE parameters 48. However, it is believed that these functions add different types of randomness for the creation of the envelope from the BRNs and thus provide additional level or layer of security. Therefore, the compromise of the BRNs does not affect the security as provided by this invention in creating random-variant-keys 18.

Furthermore, the ambiguity envelop 13 that results is indeterminate and could not have been duplicated by any means as it is a summation of different wave types, randomly selected, and used randomly assigned parameters from a random set of parameters. The ambiguity envelope does repeat but at a random cycle time. The cycle time of the envelope is based on the factorial of the cycle time of the three waves. For example, if the three cycle times are 56, 45 and 23, then the cycle time of the envelope would be a lowest number that is divisible by 56, 45 and 23. Hence the ambiguity envelope is indeterminate having been derived from the BRNs by a series of operations as described herein. The amplitude of the envelope 13 would randomly vary between the positive and negative values of maximum of sum of individual wave amplitudes. Hence the offset value 27 for a packer sequence number #X 21 may be positive or negative between these maximums or zero.

Given the same BRNs 17 at the two ends of the transmission and the same AE parameters 48, the same ambiguity envelope can be created. There may be two envelopes at each end of the transmission, one for generating random-variant-keys for encrypting outgoing packets and one for generating random-variant keys for decrypting the incoming packets. These two different envelopes may use a different set of BRNs or use the same set of BRNs but add a different phase to the envelope, so that a different random-variant-key would result for the incoming packet and the outgoing packet, even if the packet sequence number is the same and even if the packet sequence number is different. In a real transmission the packet sequence numbers may be different as more packets may be transmitted in one direction than in the other direction. For example when the same BRNs are used at the two ends, the phase offset may be zero at one end and another number at the other end. For this offset, some of the numbers from the sequence of the BRNs themselves may be used.

Envelope Offset Function 26

This function, when input a value for an x-axis, computes a y-axis value from the ambiguity envelope. The x-axes value is a packet sequence number in a session of communication. The y-axis is an envelope offset which is input to the jitter function 14. This function is input the packet sequence number at the time of the packet creation and outputs an offset value. The offset value from the envelope for a given packet sequence number maybe an integer, maybe an integer plus a fraction, or maybe positive or negative or zero. This offset may be used in a variety of random ways to provide random-variant-keys 18 as described in the jitter function 14.

Jitter Function 14

The jitter function 14 transforms the y-axis offset of the envelope into a series of numbers and this series of numbers is used to alter the pre-placed key 20 to arrive at a random-variant-key 18, where each y-axis offset yields a new random-variant-key.

The jitter function 14 may use one or a combination of techniques of, (i) the pre-placed key is altered by performing an operation such as bit reversal corresponding to the series of numbers, (ii) the pre-placed key is altered by performing an operation such as adding or subtracting the offset from the pre-placed key. Any number of possible approaches from the envelope offset maybe used to create random-variant-keys in addition to the two described above.

As a simplified illustration, using the first technique, if the offset is 329.7, the series of numbers derived from this offset may be 3, 2, 9, 32, 29, 39, 5, 11, and 14 by a combination of the numbers 3, 2, and 9. These bit numbers in the key may be flipped from a 0 to 1 or a 1 to a 0. As a simplified illustration, using the $2^{nd}$ technique, the offset number 329 may be added to the prior art key at the $7^{th}$ bit position from one end of the key. Other similar techniques that are derived from the offset value may be used. These techniques are embedded in the jitter function 14 that is present at both ends of the transmission. The technique that is used in a jitter function may be different for different classes of the devices that use the security function 10. For example one technique may be used in cell phones and another technique may be used in the wireless access points of a network.

A third technique may also be used for creating random-variant keys 18. This third technique may create two random-variant-keys for each packet that may be used as layers of keys for double encryption. For example, technique 1 may be used to create a random-variant-key1 18 and technique 2 may be used to create a random-variant-key2 18A as shown in FIGS. 3B-1 and 3B-2. Then key1 may be used to encrypt a data packet and key2 may be used to further encrypt the same data packet.

This technique provides an additional level of randomness in the generation of random-variant-keys and an additional layer of security. For a given packet even if brute force approach were attempted to break the random-variant-key for that packet alone, the plain text of the packet's data contents would not result and would not verify the accuracy of the random-variant-key.

Operational Steps

FIGS. 3A and 3B-1 & 2 describes the operation of the security function 10. As shown security function 10 of FIG. 1, has three steps, 82, 84 and 86. Step 82 is a Bounded random Number (BRN) function. The Step 84 is an ambiguity envelope function. Step 86 or 87, is a Jitter function.

Step 82

Figure 3A:
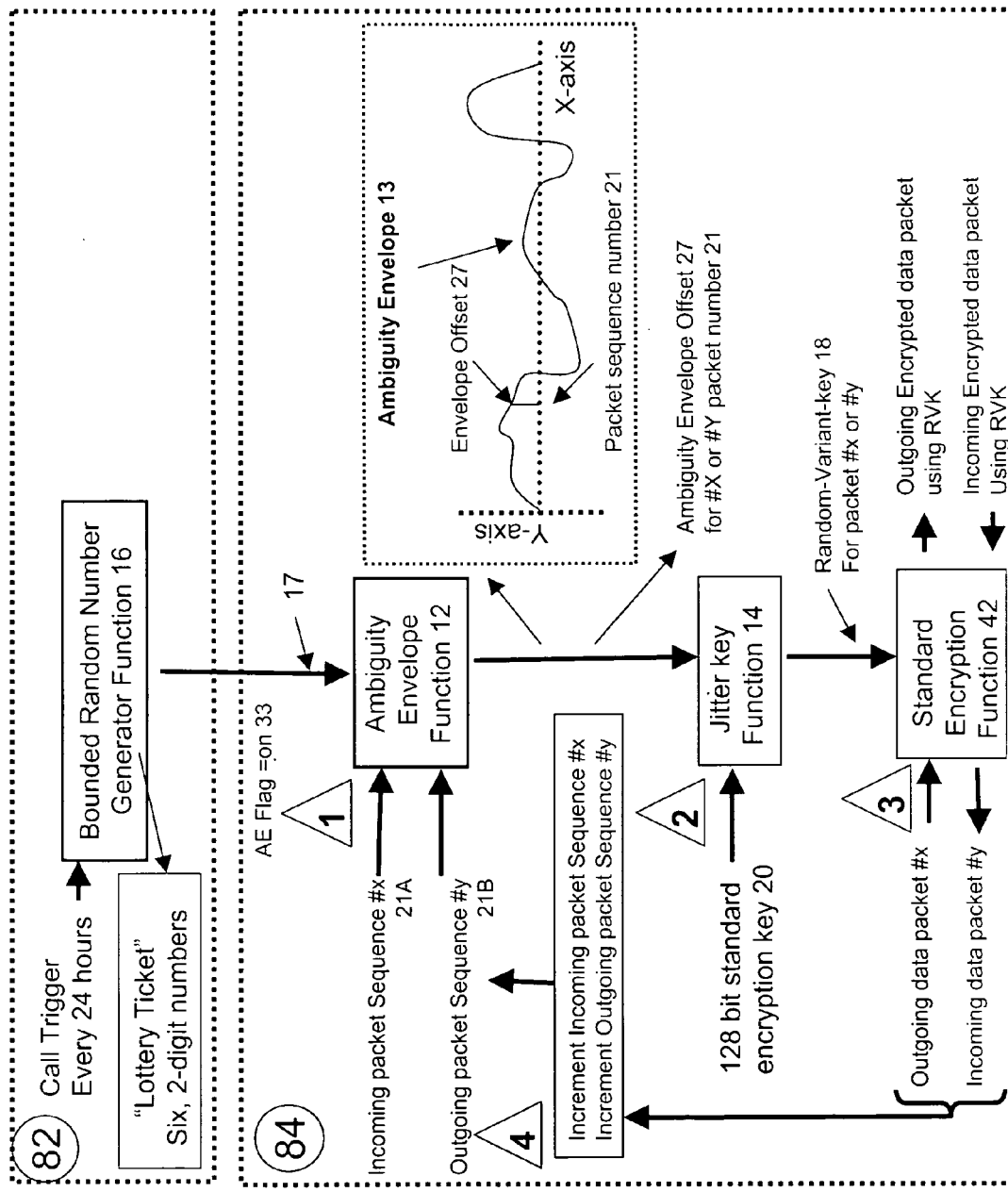

Step 82, as in FIG. 3A is a bounded random number (BRN) generator function. It is used to create six two-digit numbers. Since, such numbers are commonly used in a lottery, the output of Step 82, as such, may be named a lottery number. Hence Step 82 generates a lottery number made of six two-digit numbers. Where manual methods maybe used to copy a BRNs from one device to another device, the concept of lottery number makes it easier to humanly read, receive and enter into a device.

In this description, the terms AE coefficients, lottery number and BRN mean the same thing and may be used interchangeably. These are a set of bounded randomly generated numbers by a random number generator function. When they are limited in size such as one digit, 2 digit, etc, they are referred to as bounded random numbers. When they are bounded to 2 digits and are six in number they are referred to as a lottery ticket, as customarily, a lottery ticket has six two-digit numbers. However, depending upon the application the BRN may be longer numbers and may correspond to more than six numbers.

Step 82 is performed on one end of the two points of a wireless transmission path. Which end of the transmission link it is performed, how often it is performed or the BRNs are refreshed and how the BRNs are carried or conveyed over to the other end of the transmission path is illustrated later with reference to FIGS. 4, 5, 6 and 7 for different applications. Thus having the lottery number, AE coefficients or BRNs at both ends of the transmission now leads us to Step 84.

Step 84

As shown in FIG. 3A, Step 84 has four sub-steps 1 to 4. Optionally an AE flag 33 may be used to turn the features of security function 10 on or off in a given application.

In sub-step 1, the AE function 12 takes the lottery number 17 and creates an ambiguity envelope 13. A simplified representative envelope 13 is shown. The envelope 13 has an x-axis and y-axis. The x-axis is packet sequence number 21 and y-axis is amplitude or offset 27 for the packet sequence number 21.

Three different AE parameters 48 may be used to quantify how the BRNs 17 may be transformed into an ambiguity envelope. The AE parameters may be, (i) Wave Pairs (WP), (ii) Wave Order (WO), and (iii) Wave Type (WT).

As an illustration, if the BRN is a set of six two digit numbers 24, 64, 23, 89, 72 44, then for example, WP may be 1, 6, 2, 4, 3, 5. This means that 1st and 6th number form a pair, $2^{nd}$ and $4^{th}$ number form a pair and $3^{rd}$ and $5^{th}$ number form a pair, so that the pairs that define a wave are (24, 44), (64, 89), and (23, 72). The WO defines in each pair, which number is cycle time and which number is amplitude. For example, WO may be, (23 is Cycle time and 44 is Amplitude), (64 is amplitude and 89 is cycle time) and (23 is amplitude and 72 is cycle time). The WT defines the type of each of the waves, such as, first pair represents a Triangle wave, second pair represents a Square wave, and third pair represents a Sine wave or even a Cosine wave.

These AE parameters take the original six randomly generated numbers and turn them into three waves, each with an amplitude and cycle time. Thus the lottery number yields three waves of different amplitudes, cycle times and different shapes or types based on the lottery number set of six numbers. Then these individual waves are additively combined to yield an ambiguity envelope 13.

These steps of starting from the random bounded random numbers 17 and arriving at the ambiguity envelope 13 provide different types of randomness and break the chain of mathematical causation between the BRNs 17 and the ambiguity envelope 13.

Having a different set of AE parameters 48 enables AE function 12 to be different from application to application or even among applications by assigning a version number to the AE function.

The ambiguity envelope would repeat after a number that is equal to factored number of multiplication of three cycle times. For example, if the cycle times of the three waves are 33, 67, 99, and since 99 is divisible by 33, then the envelope would repeat after 99×67 packets or seconds (if time slice is used), because at that interval, a whole number of each of the waves are present.

The AE function 12, performs the tasks of, given or initialized with a lottery number, creates the ambiguity envelope as described above, and when is inputted a packet sequence number or time sequence, looks up the corresponding offset for it. The amplitude or offset of the ambiguity envelope may be positive, zero or negative for different packet sequence numbers. It may be a whole number that may be rounded from a fraction or may be fraction.

At sub-step 2, the standard 128-bit encryption key and the offset from the ambiguity envelope function 12 is input to the Jitter function 14. The Jitter function 14 then yields a random-variant-key 18 for a given packet sequence number, as illustrated in Step 86. At sub-step 3, a standard encryption function 42 is used with the random-variant-key 18. At sub-step 4, a function keeps track of the incoming and outgoing packet sequence numbers by incrementing these two variables. These variables are used in sub-step 1 and sub-step 3 as shown.

The Step 84 functions of AE function 12 and Jitter function 14, as outlined above, are duplicated in the software or firmware at both the ends of the wireless transmission. The separate incoming and outgoing packet sequence numbers synchronize the generation and use of the random-variant-keys 18 at both ends of transmission.

Generally for each transmission/communication, the packet sequence number is initialized. However, there may be reset or synch commands exchanged between the two ends of transmission that would reset or re-synch the packet counters to either zero or another fixed number. Alternatively, instead of packet number a time such as in seconds referenced to the beginning of the session may be used. When time is used the ambiguity envelope on the x-axis will have time in seconds. A particular offset for a given time read on the x-axis may be used until the next time segment.

Step 86

The offset 2 is used to jitter or vary the prior art key 20. For example, if the AE offset is 69, this number may be used arbitrarily so that the random-variant-key for this packet may be where the $6^{th}$, $9^{th}$, $15^{th}$ and 69th bit are flipped in the 128 bit encryption key.

If offset is zero, the packet data may be dummied up. If offset is negative, then a slightly different jitter approach may be used or the negative may be treated as a positive offset. If the offset is a whole number and a fraction such as 79.23, then these numbers may be used to decide which of the bits will be altered or flipped.

The random-variant-keys, as described above, have no mathematical relationship to the original static key 20. Thus the jitter function 14 creates a large number of random-variant-keys 18 from one original key 20 that permit a different random-variant-key to be used for each packet as long as the incoming and outgoing packet sequence numbers remain synchronized at the two ends of the wireless transmission path.

In an alternative scheme different layers of random-variant-keys may be used. For example, what is described above with reference to FIG. 3B-1 may become the first layer of random-variant-keys and what is described in Step 87, in FIG. 3B-2 may become the second layer of random-variant-key.

Step 87

FIG. 3B-2 illustrates that the offset number itself may be used to create another key, where the offset number is placed in some random variable location of the 128 bit key. As an illustration, if the offset is 329.72, the second layer of random variant key may be the number 329 starting in the $72^{nd}$ bit location. Similar other schemes may be used based on the offset.

Now with the help of FIGS. 4 to 7, different applications where the security function 10 of FIGS. 1 and 2 may be used are described. FIG. 4 describes a wireless network application, FIG. 5 describes a cell phone application, FIG. 6 describes a mobile ad hoc wireless network application, and FIG. 7 describes the use of optical means for distribution of BRNs in some of the applications.

Wireless Network Application 100.

Figure 4A:
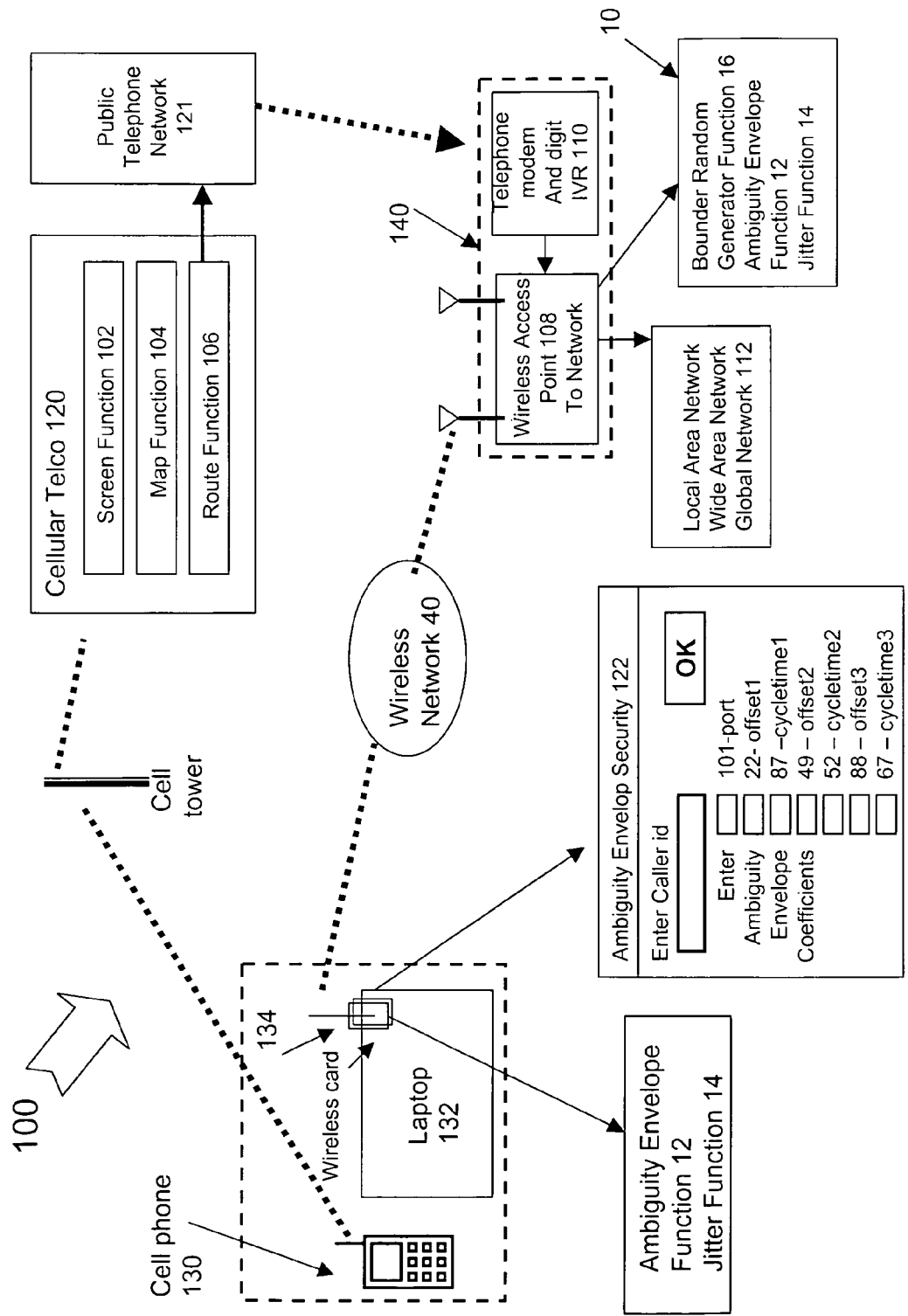
FIG. 4A is a block diagram that illustrates the application of this encryption scheme in a national wireless network of this invention.

With reference to FIG. 4A, this invention describes a system of security 100 in a nationwide wireless network that uses the security function 10 of this invention.

The system 100 may use adapted wireless access points (WAPs) 140 connected to either a local area network, a wide area network of a business or to a global network 112. The WAPs may be used by wireless devices such as laptops 132, of users with cell phones 130. The users may be employees of a business, or at large users who have subscribed to this service as described herein.

In the system 100, there is a call screening function 102 that receives cellular calls with caller id and geographic cell data and screens permitted calls based on a pre-stored list of caller id; a call mapping function 104 that maps the call to a WAP in the area identified by the cell; and a call routing function 106 that routes the call to a telephone number assigned to a WAP in the area.

The service related to functions 102, 104, and 106 maybe provided by a service provider or the service maybe provided by a cellular telephone company 120, which provides the telephone numbers. It is to be noted that the cell network provides a unique caller id mechanism that is tied to the SIM card of the cell phone, along with a cell based geographic location identification of the caller's physical location at the time the call was made.

Some of these functions, 102, 104 and 106 may be provided by a cellular company and other functions provided by a service provider. For example, the cellular company may provide caller id and geographic location data for each call and the cellular company 120 may maintain a list of authorized account holder caller ids, who have subscribed to this service and screen calls against this list and forward such screened calls to a service provider. The service provider may a business entity that maintains the servers that facilitate the automatic operation of functions 102, 104 and 106.

The service provider then may map the caller id and location data to a WAP in that geographic area. The mapping may be based on both the geographic area as well as the caller id. This dual mapping would enable identifying and mapping the callers to those WAPs that are available for certain network as those belonging to a national business based on caller id identification. This would enable different WAP and networks to be maintained for different national companies. The service provider then is able to route the calls from cell phones to a specific WAP in the geographic area.

In this system of security 100, the prior art WAP 108 is adapted with a telephone interface and a simplified IVR 110 that is able to voice deliver a sequence of numbers resembling a lottery ticket, such as two digit BRNs, to the caller.

The WAP 108 is further adapted with the functions of security function 10, as was described earlier with reference to FIG. 1. These functions are bounded random number generator function 16, ambiguity envelope function 12, and jitter function 14. These functions (i) generate BRNs, (ii) converts the BRNs numbers to an envelope, with x-axis packet and y-axis identifying envelope amplitude as an offset, and (iii) using the offset as a parameter provide random variants of the pre-placed encryption key and using the random-variant-key as the encryption key in place of the pre-placed key for encryption in the WAP.

The adaptation of WAP 108 also includes a function to receive a call, create a data record anchored by the caller id of the call, and select a port number that may be assigned to this caller, use function 16 to generate BRNs 17. The adapted WAP 140 maintains data records with the information fields of, time stamp of the call, caller id of the call, port number assigned to this call and the BRNs that were generated for this call. Similar records are maintained for each call that is received by the adapted WAP 140. The WAP 140 may also have a feature to delete such a record at the end of session or 24 hours which ever occurs first The wireless card 134 present in the laptop computer 132 of the user is an adapted wireless network interface card. The wireless interface card 134 adapted with a function to display and be able to input a series of random numbers and a port number of a WAP via a display screen 122.

The wireless card is further adapted with some of the function of security function 10 that is the ambiguity envelope function 12 and jitter function 14. These functions (i) converts the BRNs numbers that are received via screen 122, to an envelope, with x-ax-packet and y-axis identifying envelope amplitude as an offset, and (ii) a function that using the offset as a parameter provide randomly variants of the pre-placed encryption key and using the random-variant-key in place of the pre-placed key for encryption in the wireless card 134. The wireless interface card 134 of the computer device 132 is adapted to work with the adapted Wireless access point 140.

Hence, the adapted WAP 140 and the adapted wireless card 134 are able to use random-variant-keys for encryption and decryption of the wireless communication between the wireless card 134 and the WAP 140.

Figure 4B:
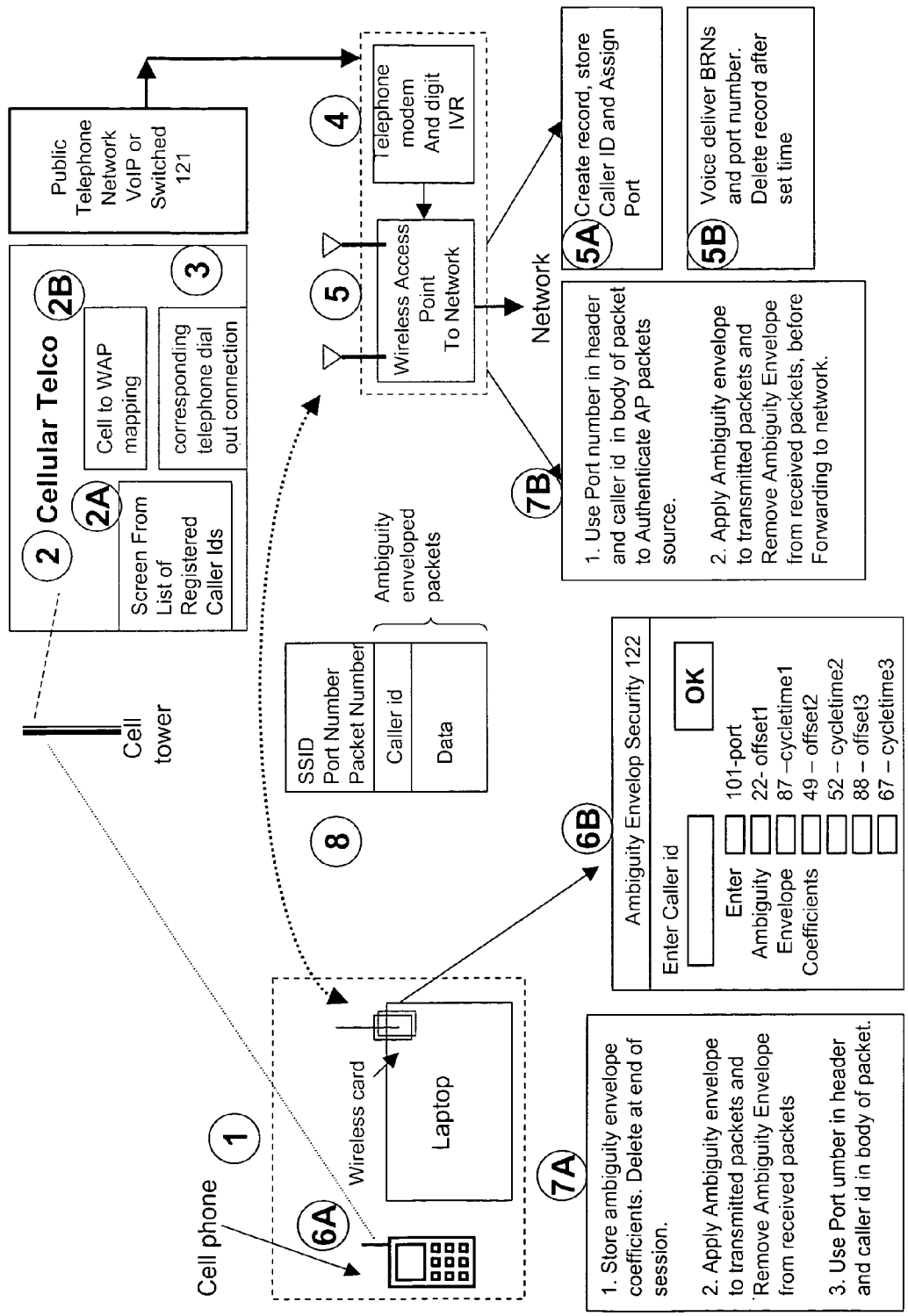
FIG. 4B is a block diagram that illustrates the operation of the application of this encryption scheme in a national wireless network of this invention.

FIG. 4B illustrates the operation of the nationwide wireless application of this invention.

At Step 1, the laptop computer user equipped with an adapted wireless card using his cell phone, calls a designated telephone number.

At Step 2, the cell phone company 120 receives the call.

At Step 2A, the service provider performs a Screen Function, which screens the call as one who has subscribed to the service, based on caller id and then routes the call to a Map function.

At Step 2B, the Map function maps the call's geographic cell location to available WAPs in that cell location. The mapping in addition to the physically proximity of the WAP to the cell location may also use the caller id for mapping. The caller id mapping may be able to differentiate those WAPs that belong to a private business network belonging to a national business and are allowed to be used by pre-identified callers with pre-registered caller ids with this business.

If the mapping function is unable to map such a refinement of location, due to multiple WAPs in the same location, the caller may be asked to select from a sorted list of locations in the specific cell by the Map functions.

At Step 3, the cellular company uses a Route function, which routes the call via a public telephone network 121 to the specific WAP approved for the caller's use from the collection of WAPs in the database.

At Step 4, thus the call, after being routed through the Screen Function, the Map function and the Route Function, is answered by the specific WAP adapted with a telephone modem interface with an IVR. The caller is unaware of these functions and the call is answered by the specific WAP close to the caller's physical location.

At Step 5, the adapted WAP 140 answers the call.

At Step 5A, the WAP 140 creates a record with the time stamp and caller id, assigns a port number, generates and stores in the record the BRNs, and voice delivers BRNs to the caller along with the port number.

At Step 5B, the WAP 140 monitors the sessions and deletes the record, if the wireless communication session is not established within a specified time threshold of the time of delivering the BRNs to the caller and deletes the record at the end of the session or up to a time limit such as 24 hours if the session is continuing. Thus the WAP does not maintain a long list of records anchored by the caller id and the port number and frees up the port for other users.

At Step 6A, the caller hears the seven numbers port number and the six BRNs and at step 6B enters them into the screen 122 that is provided by the adapted wireless card. The caller enters his caller id and clicks OK to complete Step 6B.

In this application, the caller id of the phone that is used to call the WAP or some other number that is created by the caller may be used for authentication between the laptop and the wireless access point. If the caller id is used it is automatically recorded from the call by the WAP, and is also entered by the user along with lottery numbers in screen 122 as shown in FIG. 4B. This number may be used in the body of the data packets to authenticate the laptop to the WAP and vice versa.

At step 7A, the adapted wireless card stores the BRNs and uses security function 10 to create random-variant-keys that are used in place of the standard key for encryption and decryption of the wireless communication. At Step 7B, a similar function is performed in the wireless access point 140.

At Step 8, the packets that are exchanged between the laptop and the WAP may provide the port number in the header of the packet in addition to the prior art information such as SSID. This enables the WAP to identify the packets for one of the ports and be able to find the record that has the caller id and the BRNs and know which BRNs to use for this particular laptop transmission for this particular user. This enables the WAP to apply the right envelope and the right random-variant-keys to decrypt the packet and find in the data the caller id, which is used to authenticate the laptop user as the one who made the call and was given this set of BRNs.

Cell Phone Network Security System Application 200.

Cell phones and similar wireless devices are used by individuals, law enforcement groups, business entities, and other special groups who may wish to add extra security to their conversations and data transmittals than what is provided by the digital phones themselves as part of wireless security by the cellular telephone companies. Such wireless devices are used for both voice and data communication.

As part of the encryption already provided in digital cell phones, an encryption key that may be part of the SIM of a cell phone encrypts the wireless communication from the cell phone to the cell company network, where the cell company decrypts the communication and may route it on a land line to the network of the recipient cell phone company, where the recipient phone company encrypts it with the encryption key of the recipient phone and routes it wirelessly to the recipient phone. Thus this encryption security as provided by prior art devices protects the wireless part of the communication. Many people are of the opinion that this encryption is not strong and may be broken by determined parties. The security provided by the security function 10 as described earlier with reference to FIG. 1 may additionally be provided to such a wireless or cellular network. The security function 10 may be adapted in the cell phones to work at a layer below the mode of encryption security in prior art cell phones, thus leaving the prior art encryption intact.

Figure 5:
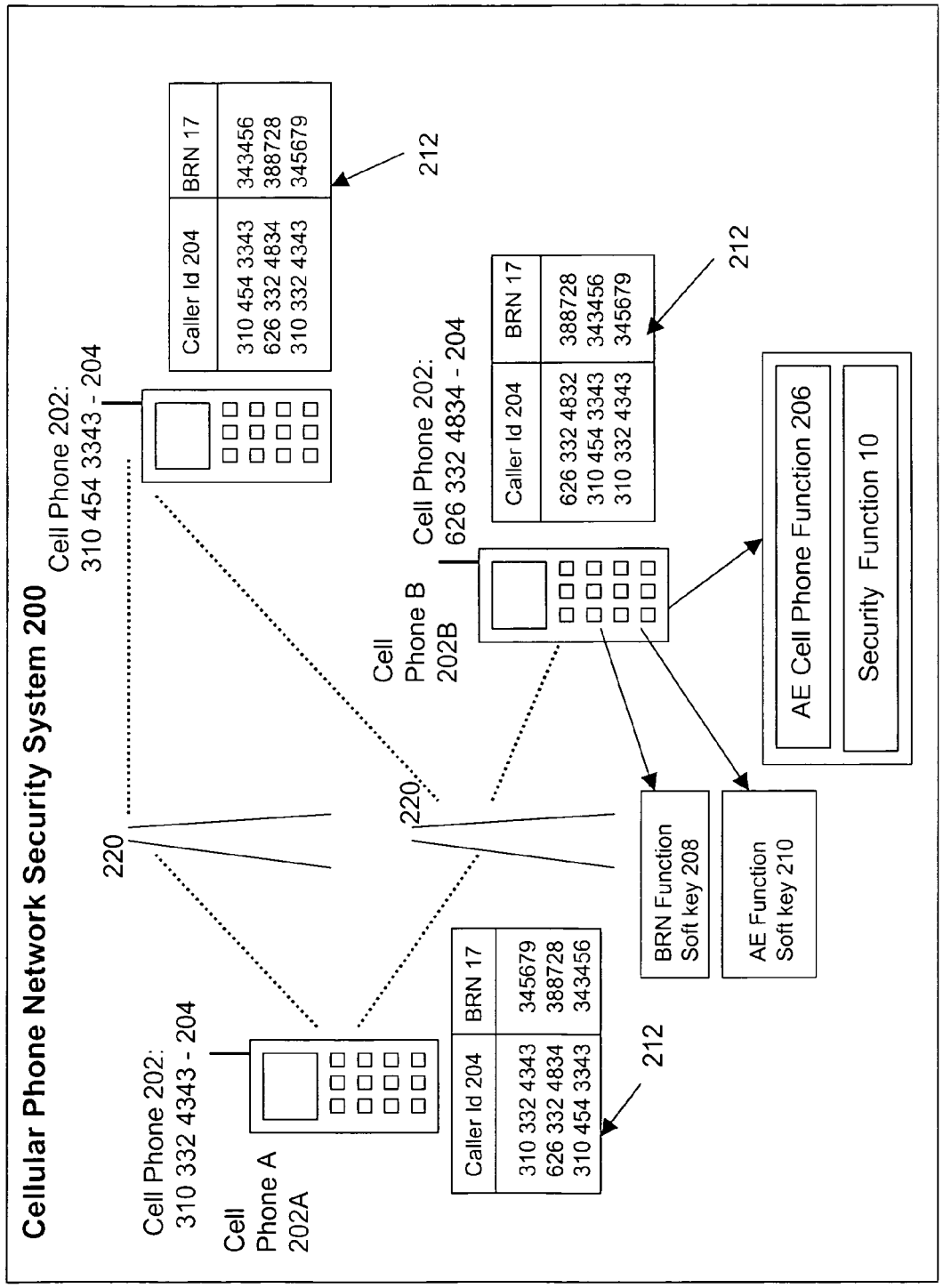
FIG. 5 is a block diagram that illustrates the operation of the application of this encryption scheme between wireless devices such as cell phones.

With reference to FIG. 5, a system of security 200 against eavesdropping between handheld wireless devices such as cell phone communication based on security function 10 is described. The system 200 has prior art cell towers 220, prior art cell phones 202, and prior art caller id 204 associated with each phone.

In system 200, each cell phone 202 is adapted to provide the security function 10 as has been described earlier with reference to FIG. 1. In this adaptation, each cell phone is further adapted with an AE cell Phone Function 206, BRN Function key 208 and AE function key 210.

The AE cell phone function 206 provides interfaces to soft key 208 and soft key 210 and maintains a table 212. The table 212 maintains a list of phones identified by caller id 204 and their corresponding BRNs 17.

When the BRN function key 208 is activated, it launches the BRN function 16 of the security function 10 and displays BRNs 17 on the screen of the phone 202. These BRNs 17 are then manually transferred or copied to other cell phones. The BRNs may also be transferred via an optical interface, if the phones 202 are equipped with such an interface.

The function 206 maintains a table 212, which for each caller id 204 maintains the corresponding BRN 17. Thus function 206 allows each phone to maintain a BRN for itself and each phone it may choose to communicate with the use of security function 10.

Soft key 210 enables each phone 202 to choose to activate the security function 10 for all calls or for some calls by turning the soft key on and off. When the soft key 210 is off, the phone works like a prior art phone without using the security function 10. hence, in this system 200, each phone may selectively enable and disable the security function 10 for each communication by setting a flag via soft key 210 that is under the control of the user.

In FIG. 5, for the purpose of explanation, one of the cell phones 202 is identified as cell phone A 202A and another is identified as cell phone B 202B.

When cell phone A communicates with the cell phone B, and when the soft key 210 is activated in the cell phone A, the cell phone A activates the function 206. The AE cell phone function 206 searches for the BRNs in the table 212, that are applicable to the caller id 310 332 4343 of cell phone A (caller phone), as 345679 and searches for the BRNs in the same table 212, that are applicable to the caller id 626 332 4834 of cell phone B (called phone). The function 206 with the help of function 10 uses these BRNs to generate random-variant-keys and uses random-variant-keys for encrypting outgoing transmission that are from the BRN associated with own caller id and uses the random-variant keys for decryption that are from the BRN that is associated with the caller id of the other phone in the table 212. A similar operation takes place in the called cell phone B.

Cell phone A and B each equipped with a security function 10 that generates BRNs for each phone or caller id, converts each BRNs at each end into an ambiguity envelope, with an x-axis and a y-axis and with a jitter function 14 that using the offset from the envelope creates a time and packet dependent sequence of random-variant-keys from the existing key and use such keys for encryption.

Hence in this application, it is possible, while leaving all the functions of existing cell phone intact, add or overlay AE encryption security between any two or more specific cell phones. Each cell phone pair may have software functions that enable a layer of encryption using AE in addition to what ever is used in prior art. Hence, the AE can be optionally be used between any two phones and not other phones and not all phones and it may be activated or deactivated to be used or not used for each call. When the call is received at a cell phone and if AE is on, then it checks the caller id against the list and if a BRN is found, which will be the same as used by the caller, then AE encryption is used.

The system of security 200 has an exchange mechanism where the cell phones may use manual, infrared, and radio frequency means of exchanging the BRNs. AE may also be used in many other wireless as well as wired applications that are not described here.

Mobile Ad Hoc Wireless Networks 400.

Figure 6:
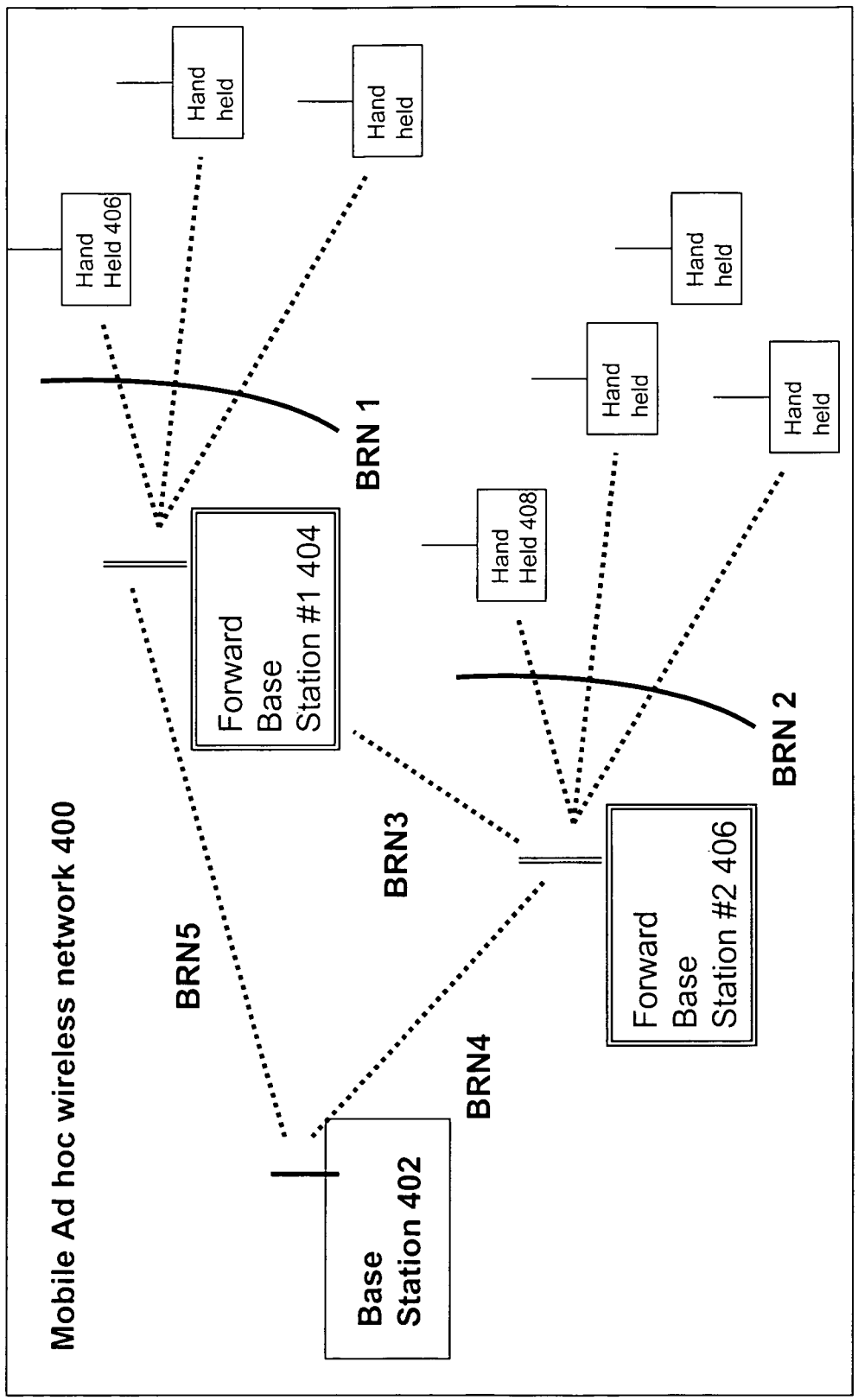
FIG. 6 is a block diagram that illustrates the operation of the application of this encryption scheme in a mobile ad hoc wireless network.

Some times ad hoc wireless networks may need to be set up in remote areas and or in a theatre of operation. FIG. 6 shows the mobile ad hoc wireless network application 400 most likely to be used in a theatre of operation. Assuming such an application 400 has a base station 402 and multiple forward base stations such as 404 and 406, and each base station supports multiple hand held units 406 and 408.

These base stations 402, forward stations 404 and 406 and handhelds 406 and 408 may be equipped with the security function 10 as has been described earlier with reference to FIG. 1.

In such an application 400, BRNs may be generated in the forward base station 404 and either may be manually keyed in each of the hand sets 406 for this forward base station. Alternatively, as shown in FIG. 7, if the forward base station and the hand held units are equipped with infrared capability, then the BRN may be transferred to all hand units at one time within a few seconds from the forward base station by placing them in close proximity to each other.

Figure 7:
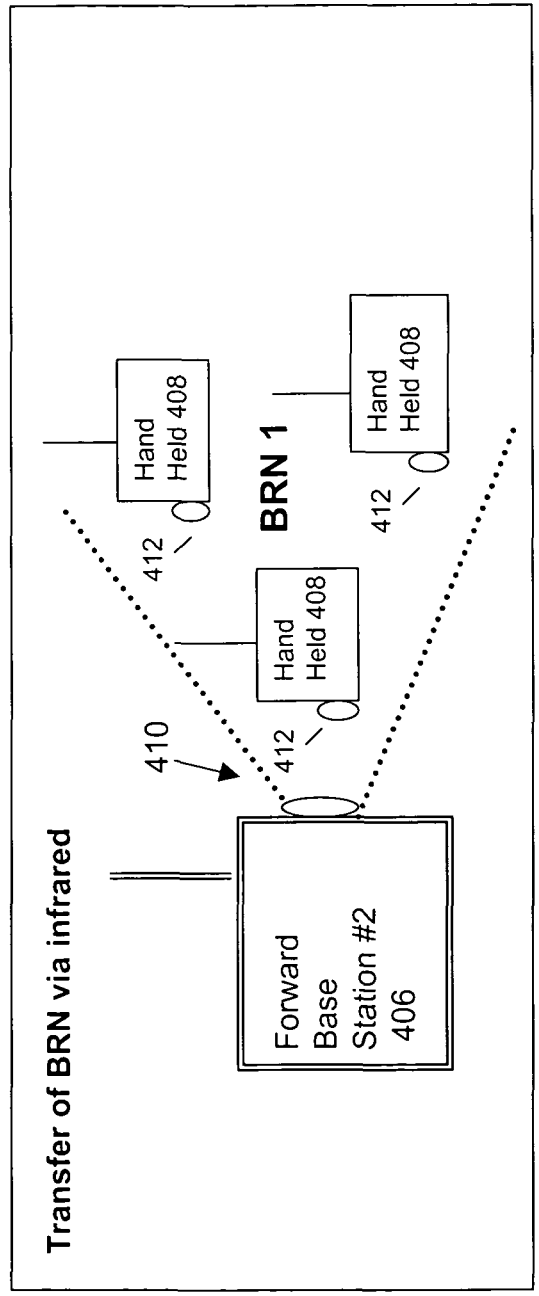
FIG. 7 is a block diagram that illustrates the use of optical means to transfer BRNs between devices that use the encryption scheme of this invention.

As shown in FIG. 7, the base station #2 406 is equipped with an optical transmitting means 410 and each of the handhelds 408 are equipped with an optical receiving means 412. Multiple handhelds 408 may be placed as a group in the optical transmitting path of optical interface 410 and thus would be able to simultaneously transfer the BRNs to the handhelds 408. The BRNs may be changed for each mission or whenever desired for security reasons of the environment where the mobile ad hoc wireless network is put in place.

Hence, optical means such as use of infrared, if the devices are equipped with infrared sensors such as commonly used in televisions and like, may be used to quickly and efficiently transfer the BRNs to the other end of the transmission path.

Different BRNs may be used for different forward base stations. For example forward base station #1 404 may use BRN1 that it generated for its hand held units 406. Forward base station #2 406 may use BRN2 that is generated for its hand units 408.

Forward base station # 1 to communicate with forward base station #2 may generate BRN3 and that may be manually entered in forward base station #2 or copied via other means. Each of the forward base stations may use a different BRN such as BRN 4 and BRN 5 when communicating with the base station 402. These BRNs 4 and 5 may be generated by base station 402 and manually communicated and entered in by the people setting up the base units at the time of set up.

This having different BRNs spread out over a theatre of operation of ad hoc mobile network provides additional transmission security.

Other Applications

There are many other applications where the security function 10 may be used in addition to the three applications of wireless networks, cell phone networks and ad hoc wireless networks as described above.

In an application, the wireless and wired part of a network may be combined to provide the security function 10 over an entire network from end to end. In this application the user of a laptop may directly contact the host computer and receive BRNs. While the user may still use a wireless network, the security function 10 may provide security over the entire network from the laptop to the host computer including the wireless and the wired part of the network to the host computer.

The system of security 10 may also be used in the wireless device that may be Bluetooth equipped device, where the communication is between the cell phone and a Bluetooth extension of the device such as an earpiece.

If the other end of the Bluetooth device is an earpiece, which may use prior art means of switches and display window to manually transfer the BRN. The cell phone owner reads the BRNs on the phone and one by one manually transfers them to the earpiece via the switches and the display. This manual operation is required to be done only once by the user or when ever he/she wants to reset the encryption, every few months or year or so. Alternatively, if the Bluetooth devices are so equipped, the BRNs may be transferred via Bluetooth format or an optical format.

Another application may be satellite to ground communication, where the BRNs may be long and complex and are installed in the satellite at launch times or they may be updated at other times by other means.

The security function 10 may be implemented in software, firmware and hardware integrated circuits depending upon the application. If implemented in an integrated circuit chip that embeds the security function 10 then it has, (i) an interface for inputting a series of bounded random numbers, (ii) a logic that converts the numbers to an envelope, with x-axis corresponding to a packet sequence and y-axis corresponding to an envelope amplitude offset for a packet sequence, and (c) a logic that uses the offset for a packet sequence number and a static encryption key as inputs and randomly variates the static encryption key outputting random-variant-keys, thereby enabling the use of the random-variant-keys for encryption and decryption of data packets in place of the static key.

The use of security function 10 in these and other applications provides for a robust and in-depth transmission security, where the security of the communication is not dependent upon the security of prior art encryption keys and thus reduces the cost and effort of frequently updating the prior art encryption keys and maintaining a key management infrastructure for them.

While the particular system and method as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

What is claimed is:

1. A method of creating a sequence of random numbers, comprising the steps of:
   a. having a set of at least three periodic waves in a digital computing machine, the set including at least, one of each type of wave of, a triangle, a square and a sine function;
   b. combining additively in the digital machine the set of waves to yield a random wave envelope;
   c. using time and amplitude properties of the random wave envelope creating a sequence of random numbers.

2. The method as in claim 1, comprising:
   a. deriving from a one or more random numbers, a set of bounded random numbers where each bounded random number is bounded to have a maximum number of digits;
   b. shuffling the set of bounded random numbers to become a random set of parameters of the set of waves.

3. The method as in claim 2, comprising:
   mapping the random set of parameters to each of the wave types of the triangle, the square and the sine function.

4. The method as in claim 3, comprising:
   assigning randomly the random set of parameters of each wave to the properties of each wave of (i) an amplitude, and a cycle time or (ii) an amplitude, a cycle time and a phase.

5. The method as in claim 2, comprising:
   distributing the set of bounded random numbers at each end of a communication channel, enabling the random wave envelope to be created at each end of the channel;
   using the time and amplitude properties of the random wave envelope for generating a sequence of random numbers at each end of the communication channel.

6. The method as in claim 1, comprising:
   using the sequence of random numbers for use in creating a sequence of random-variant encryption keys for data security.

7. The method as in claim 1, comprising:
   duplicating the random wave envelope at each end of a communication channel enabling the sequence of random numbers to be used for keys used for encryption and decryption at the each end of the communication.

8. A device for information security, comprises:
   a. an integrated circuit that has an interface for inputting a set of bounded random numbers;
   b. the circuit has a logic that converts the set of bounded random numbers to a set of parameters of waves, the waves of one of each type, triangle, square and sine, and additively combines the waves to yield a random wave envelope, the logic uses time and amplitude properties of the random wave envelope to derive a sequence of random numbers for use in a security function in the device.

9. The device as in claim 8, further comprising:
   the circuit has a logic that shuffles the set of bounded random numbers to be parameters of the waves.

10. The device as in claim 9, further comprising:
    the circuit has a logic that maps the parameters to each of the wave types to represent wave parameters of (i) an amplitude, and a cycle time or (ii) an amplitude, a cycle time and a phase.

11. The device as in claim 8, further comprising:
    the circuit has a logic that use the random wave envelope for deriving a sequence of random numbers from a y-axis offset of the random wave for an x-axis corresponding to a packet number.

12. The device as in claim 11, further comprising:
    a logic that uses the y-axis random wave offset for a x-axis packet number and a static encryption key as inputs and generates random-variant-keys, enabling the use of the random-variant-keys for encryption and decryption of data packets in place of the static key.

13. The device as in claim 11, further comprising:
a logic that uses the y-axis random wave offset for an x-axis packet number and jitters the static encryption key by modifying the static key by altering the bits of the static key that correspond to the random number for this packet to generate a random-variant-key, enabling the use of the random-variant-keys for encryption and decryption of data packets in place of the static key.

14. The device as in claim 11, further comprising:
a logic that uses the y-axis random wave offset for an x-axis packet number and jitters the static encryption key by adding the random number to the static key for this packet to generate random-variant-key, enabling the use of the random-variant-keys for encryption and decryption of data packets in place of the static key.

15. The device as in claim 8, further comprising:
the circuit is placed in devices at each end of a communication channel.

16. An apparatus for generating a sequence of random numbers, comprising:

a. a function in a digital machine that generates a set of at least three periodic waves, the set including at least one of each wave type of a triangle, a square and a sine function;
b. a function in the digital machine that additively combines the set of waves to yield a random wave envelope;
c. a function that generates a sequence of random numbers by using time and amplitude properties of the random wave envelope.

17. The apparatus in claim 16, comprising:
a. a function that generates one or more random numbers and using the one or more random numbers to generate a set of at least six bounded random numbers, where each bounded number is maximum digit limited;
b. a function that derives from the set of bounded random numbers, a random set of parameters of each of the waves to include parameters of, a cycle time, and an amplitude or a cycle time, an amplitude and a phase.

18. The apparatus as in claim 17, comprising:
a function that shuffles the random set of parameters to become a random set of parameters of each of the waves.

* * * * *